(12) United States Patent
Simoes et al.

(10) Patent No.: US 7,268,519 B2
(45) Date of Patent: *Sep. 11, 2007

(54) PORTABLE BATTERY CHARGER FOR A MOBILE DEVICE

(75) Inventors: Felipe Oliveira Simoes, Kitchener (CA); Dan G. Radut, Waterloo (CA)

(73) Assignee: Research In Motion Limited, Waterloo (CA)

( * ) Notice: Subject to any disclaimer, the term of this patent is extended or adjusted under 35 U.S.C. 154(b) by 593 days.

This patent is subject to a terminal disclaimer.

(21) Appl. No.: 10/443,286

(22) Filed: May 22, 2003

(65) Prior Publication Data
US 2005/0046384 A1 Mar. 3, 2005

Related U.S. Application Data

(63) Continuation of application No. 10/007,848, filed on Nov. 5, 2001, now Pat. No. 6,583,601.

(60) Provisional application No. 60/246,142, filed on Nov. 6, 2000.

(51) Int. Cl.
*H01M 10/44* (2006.01)
*H01M 10/46* (2006.01)

(52) U.S. Cl. .................................................... 320/114

(58) Field of Classification Search ................ 320/103, 320/107, 111, 112, 113, 114, 115, 118, DIG. 12
See application file for complete search history.

(56) References Cited

U.S. PATENT DOCUMENTS

| | | |
|---|---|---|
| 3,775,659 A | 11/1973 | Carlsen, II |
| 4,433,251 A | 2/1984 | Banks et al. |
| 4,510,431 A | 4/1985 | Winkler |
| 5,173,855 A | 12/1992 | Nielsen et al. |
| 5,229,649 A | 7/1993 | Nielsen et al. |
| 5,272,475 A | 12/1993 | Eaton et al. |
| 5,444,378 A | 8/1995 | Rogers |
| 5,568,038 A * | 10/1996 | Tatsumi ................. 320/103 |
| 5,631,503 A | 5/1997 | Cioffi |
| 5,638,540 A | 6/1997 | Aldous |
| 5,651,057 A | 7/1997 | Blood et al. |
| 5,769,877 A | 6/1998 | Barreras, Sr. |
| 5,850,113 A | 12/1998 | Weimer et al. |
| 5,939,860 A | 8/1999 | William |
| 6,049,192 A * | 4/2000 | Kfoury et al. ........... 320/113 |
| 6,104,162 A | 8/2000 | Sainsbury et al. |
| 6,104,759 A * | 8/2000 | Carkner et al. ........... 307/31 |
| 6,583,601 B2 * | 6/2003 | Simoes et al. ........... 320/114 |

OTHER PUBLICATIONS

Electric Double-Layer Capacitors, vol. 2, Oct. 25, 1996 (Japan, Tokin Corp., Cat No. EC-200E).
Supercapacitor: User's Manual, vol. 2 (Japan, Tokin Corp., date unknown).
Charging Big Supercaps, Portable Design, p. 26, Mar. 1997.

* cited by examiner

*Primary Examiner*—Edward H Tso
(74) *Attorney, Agent, or Firm*—Jones Day; Krishna K. Pathival; Robert C. Liang

(57) ABSTRACT

A portable battery charger for a mobile device having a rechargeable battery includes battery contacts, a switching regulator, and a charger interface. The battery contacts are configured to receive a battery having a low-voltage value. The switching regulator is coupled to the battery contacts and configured to draw the low-voltage value from the battery and convert the low-voltage value to a charger output. The charger interface is configured to electrically engage the mobile device and is further configured to couple the charger output from the switching regulator to the rechargeable battery in the mobile device.

31 Claims, 4 Drawing Sheets

PORTABLE BATTERY CHARGER FOR A MOBILE DEVICE

CROSS-REFERENCE TO RELATED APPLICATION

This application is a continuation of U.S. application Ser. No. 10/007,848, entitled "Portable Battery Charger," filed Nov. 5, 2001, now U.S Pat. No. 6,583,601 which claims priority from U.S. Provisional Application No. 60/246,142, entitled "Portable Battery Charger," filed Nov. 6, 2000. Both of these prior applications are incorporated herein by reference.

BACKGROUND

1. Field of the Invention

This invention relates to battery chargers. Particularly, the invention relates to portable battery chargers for use with mobile communication devices.

2. Description of the Related Art

Many electronic devices, such as mobile communication devices, are powered by rechargeable batteries. Typically, rechargeable batteries include Lithium-ion (LiIon) and Nickel Cadmium (NiCad) cells. Instead of powering down the device and replacing the rechargeable battery, these electronic devices are typically plugged into a battery charger when the rechargeable battery is in a low charge state. Battery chargers typically include a cord that plugs into an electrical wall outlet and the electronic device.

SUMMARY

A portable battery charger for a mobile device having a rechargeable battery includes battery contacts, a switching regulator, and a charger interface. The battery contacts are configured to receive a battery having a low-voltage value, that is, less than a rechargeable battery's fully charged value. The switching regulator is coupled to the battery contacts and configured to draw power from the low-voltage battery and convert the low-voltage input to a charger output. The charger interface is configured to electrically engage the mobile device and is further configured to couple the charger output from the switching regulator to the rechargeable battery in the mobile device.

DETAILED DESCRIPTION

Figure 1:
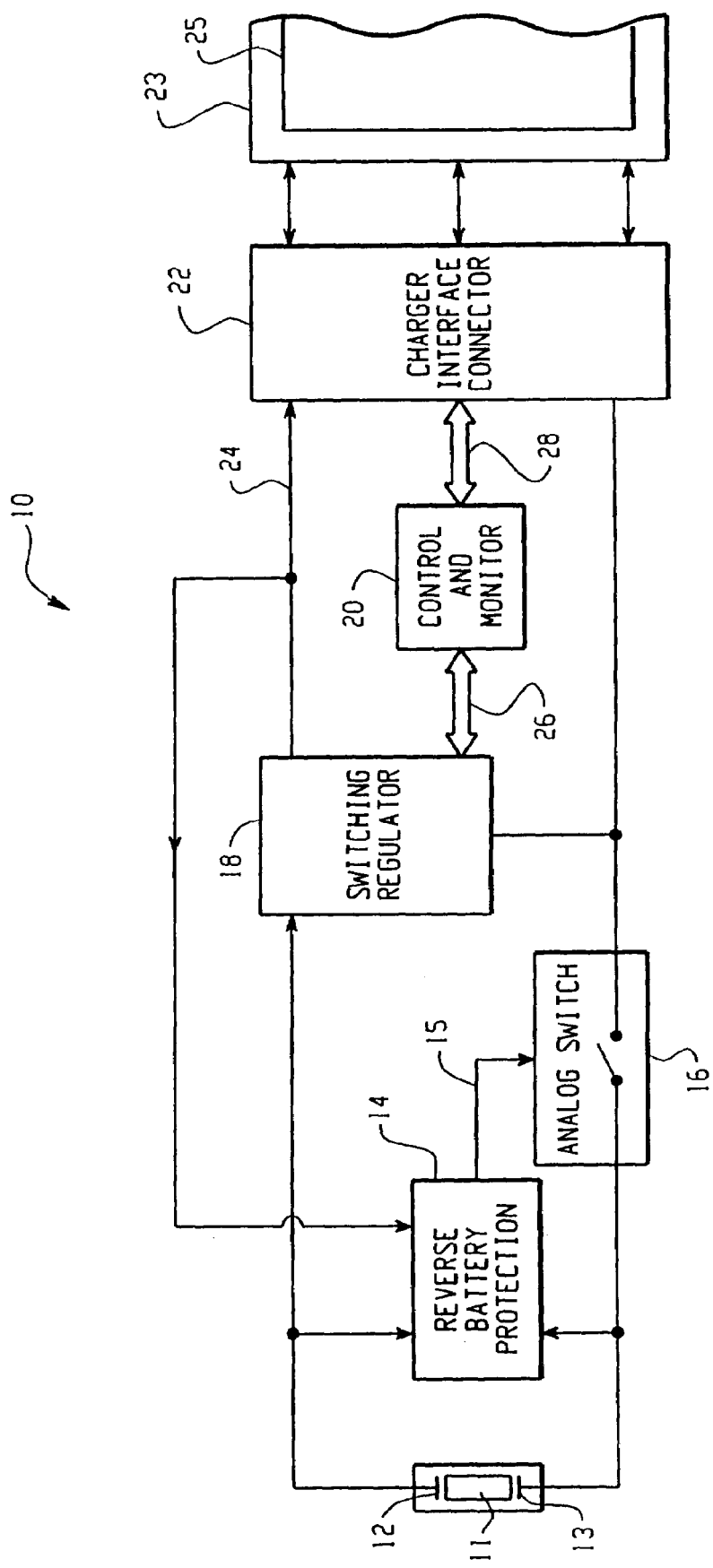
FIG. 1 is a block diagram of a portable charger circuit.

Referring now to the drawing figures, FIG. 1 is a block diagram of a portable charger circuit 10. The charger circuit 10 includes a low-voltage battery 11 and first and second battery contacts 12 and 13, which provide power to the charger circuit 10. A reverse battery protection module 14, an analog switch 16, a switching regulator 18, and a control and monitor module 20 operate together to transform the charge in the low voltage battery 11 into a charger output 24. A charger interface connector 22 communicates with a mobile device 23 having a rechargeable battery 25. The battery 11 inserted between the battery contacts 12 and 13 charges the rechargeable battery 25 (such as a LiIon cell battery) in the mobile device 23 through the charger interface connector 22.

The battery contacts 12 and 13 are coupled in parallel with the reverse battery protection module 14. In addition, one of the battery contacts 12 is also coupled to the switching regulator 18, and the other battery contact 13 is coupled both to the switching regulator 18 and the charger interface 22 through the analog switch 16. The analog switch 16 receives a control signal 15 from the reverse battery protection module 14 that can open the analog switch 16 in order to decouple the battery 11 from the charger circuit 10. The switching regulator 18 generates the charger output 24, which is fed back to the reverse battery protection module 14, and which is also coupled to the charger interface connector 22. The control and monitor module 20 communicates with the switching regulator 18 and the charger interface connector 22 through control signals 26 and 28. The charger interface connector 22 preferably communicates to the mobile device 23 through a serial connection, such as a 16-pin miniature connector.

Preferably, one of the battery contacts 12 is a positive terminal and the other battery contact 13 is a negative terminal. When a battery 11 is inserted between the battery contacts 12 and 13, the reverse battery protection module 14 detects whether the battery 11 is inserted correctly by checking the polarity of the battery 11. If the battery polarity is reversed, then the control signal 15 from the reverse battery protection module 14 opens the analog switch 16, thereby decoupling the negative terminal 13 from the switching regulator 18 and charger interface connector 22. The reverse battery protection module 14 thus protects the circuit 10 from reverse polarity that could occur if a battery 11 was inserted incorrectly. By maintaining the analog switch 16 in the off (open) position, the reverse battery protection module 14 prevents any charge from the battery 11 from leaking to the switching regulator 18, or to other components in the circuit 10.

The reverse battery protection module 14 also monitors the charge line to turn the analog switch 16 on in the presence of an operational rechargeable battery.

If the battery 11 is installed correctly between the contacts 12 and 13, then the switching regulator 18 is preferably powered from a low-voltage value battery 11 and provides power to the charger output 24, which is used to charge the rechargeable battery 25 in the mobile device 23. The switching regulator 18 preferably operates in one of two different modes depending on the voltage of the rechargeable battery 25 in the mobile device 23. When the rechargeable battery voltage is low, then the switching regulator 18 preferably operates in a current limiting mode. In this mode, the switching regulator 18 generates a constant current output 24 through the charger interface connector 22 to the mobile device 23. The rechargeable battery 25 is charged from this constant current output 24 until the rechargeable battery 25 reaches a threshold voltage, which depends on the LiIon battery voltage. Once the threshold voltage is reached, then the switching regulator 18 preferably switches to a constant voltage mode. In the constant voltage mode, the switching regulator 18 preferably generates a constant voltage output 24 to charge the rechargeable battery 25. As the rechargeable battery 25 voltage rises to its final charge value, that is, the rechargeable battery is fully charged, the feedback signal 28 from the mobile device 23 is used to regulate the output of the switching regulator 18 in order to keep the voltage constant at the rechargeable battery 25 terminals.

The differing modes for charging the rechargeable battery 25 are provided in order to achieve efficient recharging. When the charger circuit 10 is in the current limiting mode, the switching regulator 18 preferably generates a full duty cycle charger output 24. Thus, when the voltage of the rechargeable battery 25 is below the threshold level, the rechargeable battery 25 is charged on a full duty cycle. Once the threshold voltage is reached, however, the voltage of the battery 11 is no longer sufficient to charge the rechargeable battery 25, and the switching regulator 18 switches to a constant voltage mode to increase the voltage of the charger output 24. The control and monitor module 20 monitors the feedback signal 28 to determine the voltage of the rechargeable battery 25. As the rechargeable battery voltage exceeds the threshold voltage, the control and monitor module 20 controls the output voltage of the charger output 24. As the rechargeable battery voltage increases, the control and monitor module 20 increases the voltage of the charger output 24 in order to continue to charge the rechargeable battery 25.

The control and monitor module 20 monitors signals 26 and 28 from the switching regulator 18 and the mobile device to control the operation of the circuit 10. For example, the control and monitor module 20 may monitor the voltages of the charger battery 11 and the rechargeable battery 25, and control signals from the mobile device 25. The control and monitor module 20 monitors the charger battery 11 to determine when the voltage of the battery is below 1.0 V. When the voltage is below 1.0 V, the control and monitor module 20 sends a signal to the switching regulator 18 to shut it down in order to prevent damage to the switching regulator 18. The control and monitor module 20 may also send a signal to the mobile device 25 to report the low voltage to a user of the device so that the user can replace the charger battery 11. As described above, the control and monitor module 20 may also monitor the rechargeable battery voltage to determine when to switch modes on the switching regulator 18, and to turn off the switching regulator 18 when the rechargeable battery 25 reaches a desired voltage level.

The voltage of the rechargeable battery 25 is monitored by the control and monitor module 20 through the charger interface connector 22 as an analog feedback signal 28. The control and monitor module 20 monitors the feedback signal 28 to determine when to send a control signal 26 to the switching regulator 18 to change modes from current limiting to constant voltage. This signal is preferably sent to the switching regulator 18 when the feedback signal 28 is around the threshold value. The control and monitor module 20 then monitors the feedback signal 28 to ramp up the charger output 24 as the rechargeable battery 25 is charged to the final desired voltage level (fully charged). The switching regulator 18 thus produces an output signal 24 at a voltage that is higher than the voltage of the rechargeable battery 25. The charging continues until the rechargeable battery 25 is fully charged (around 4.1 V), or the charger battery voltage drops to 1.0 V. If the charger battery voltage drops to 1.0 V, then the control and monitor module 20 may send a signal to the mobile device 23, which can notify a user that the charger battery 11 is in a low voltage state, and charging has stopped. The control and monitor module 20 thus monitors the charge in both batteries to determine how to charge the rechargeable battery 25 from the charger battery 11.

For example, when a user determines that the rechargeable battery 25 in the mobile device 23 is in a low charge state, then the user connects the charging circuit 10 to the mobile device 25. The control and monitor module 20 detects the presence of the mobile device 25 and also detects the presence of the charger battery 11 in the charger circuit 10. The control and monitor module 20 then directs the switching regulator 18 to begin generating the charger output 24. Assuming the rechargeable battery 25 is in a charge state with a voltage below the final fully charged state, the control and monitor module 20 directs the switching regulator 18 to charge in current limiting mode. The control and monitor module 20 then monitors both batteries 11 and 25 for changes in their respective terminal voltages. When the rechargeable battery 25 is charged to a state where its voltage equals the final fully charged state, then the control and monitor module 20 switches the switching regulator 18 to the constant voltage mode. The control and monitor module 20 provides the voltage level of the rechargeable battery 25 to the switching regulator 18 so that the charger output 24 is regulated to keep the voltage constant at the rechargeable battery 25 terminals. The control and monitor module 20 then sends a shutdown signal to the switching regulator 18 when the voltage of the charger battery 11 is below 1.0 V, or the rechargeable battery 25 is fully charged. In an alternative embodiment, other control signals 28 from the mobile device 23 may also shut down the charging operation. For example, a temperature monitor on the mobile device 23 may generate a shutdown signal if the rechargeable battery 25 overheats during charging.

Figure 2:
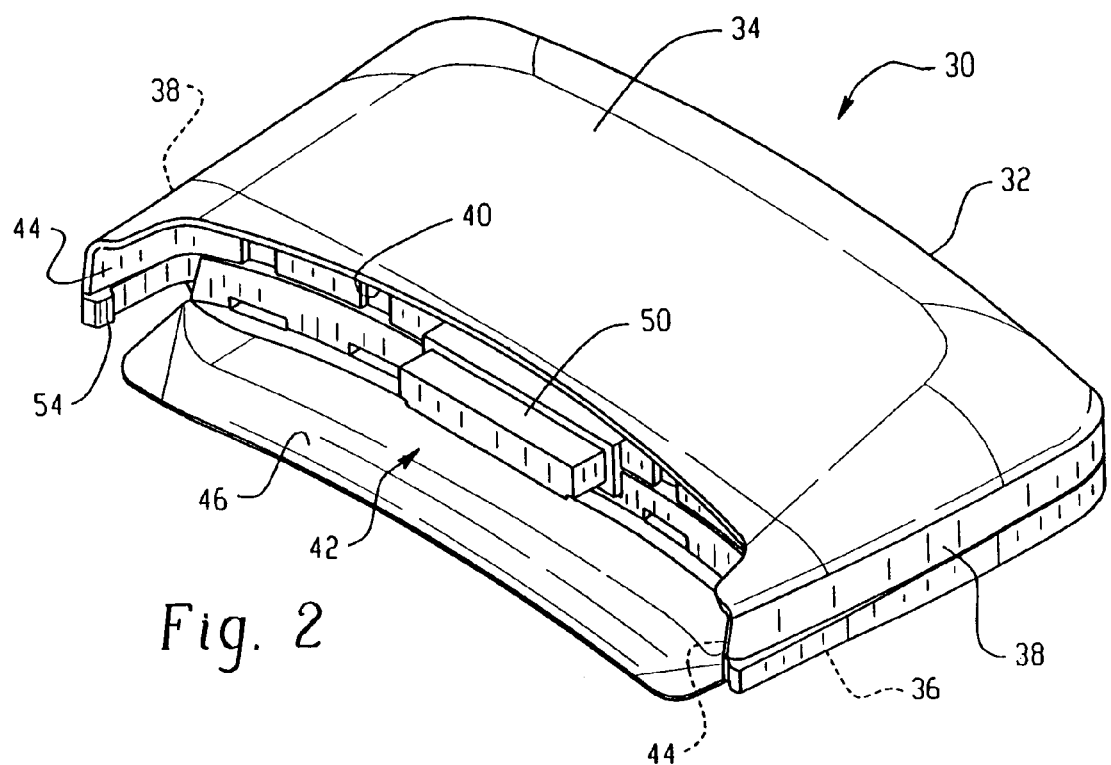
FIG. 2 is an orthogonal view of the front of a portable charger.
Figure 5:
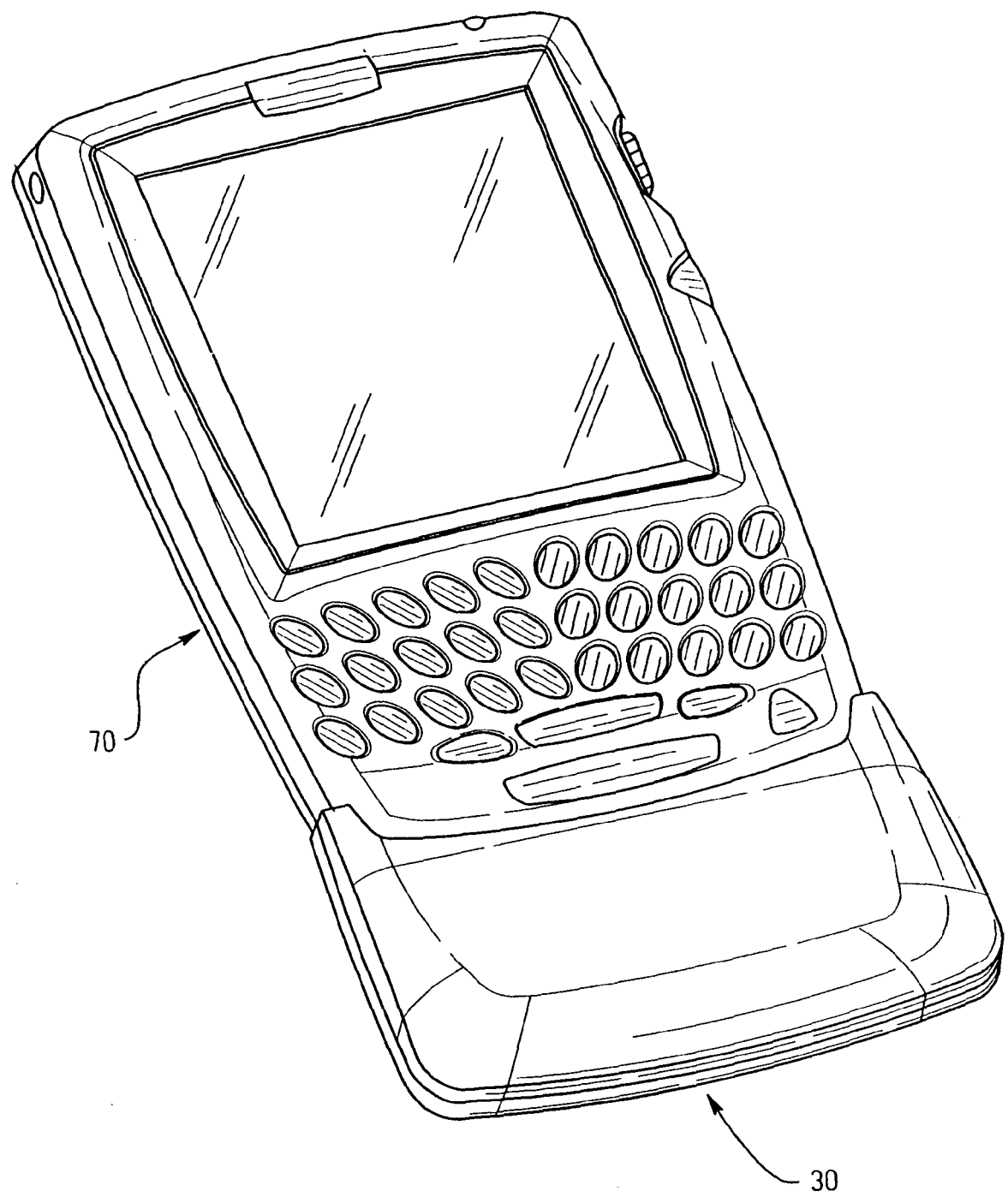
FIG. 5 is an orthogonal view of the portable charger connected to a portable electronic device.

FIG. 2 is an orthogonal view of the front of a portable battery charger 30. The battery charger 30 includes a generally rectangular housing 32. The housing includes a front wall 34, a back wall 36 and side walls 38. The back and side walls 36 and 38 extend past an edge 40 of the front wall 34 to form a well 42. The well 42 receives and mates with the mobile device 70 (FIG. 5). Side wall guides 44 guide the edges of the mobile device 70 into the well 30. An edge surface guide 46 of the back wall 36 guides the back of the mobile device 70 into the well 42. The guides 44 and 46 direct a pin connector on the mobile device 70 to mate with a connector 50 on the battery charger 30. The connector 50 may, for example, be the charger interface connector 22 described above with reference to FIG. 1. In this example, the connector 50 is a male pin connector, but other connectors on the battery charger 30 could instead include a female pin connector configured to mate with a male pin connector on the mobile device.

Prongs 54 engage the sides of the mobile device 23 so that the portable charger 30 is supported on the device through the prongs 54 instead of being supported through the pin connector 50. The prongs 54 preferably snap into notches in the side of the mobile device 70 such that an interference fit is achieved between the prongs 54 and the notches that can support the weight of the portable charger 26. The portable charger 30 can preferably be removed from the mobile device 70 by sliding the portable charger 30 away from the mobile device 70. The prongs 54 flex away from the sides of the mobile device 70 when the charger 30 is slid away from the mobile device 70.

Figure 3:
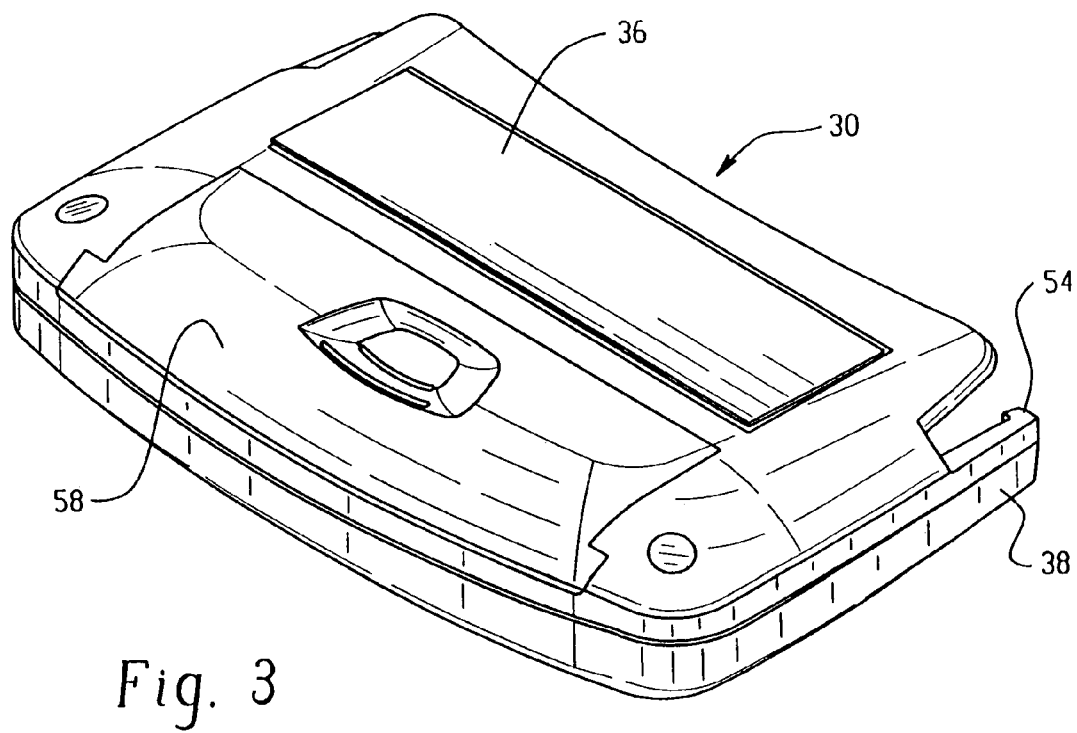
FIG. 3 is an orthogonal view of the back of the portable charger.
Figure 4A:
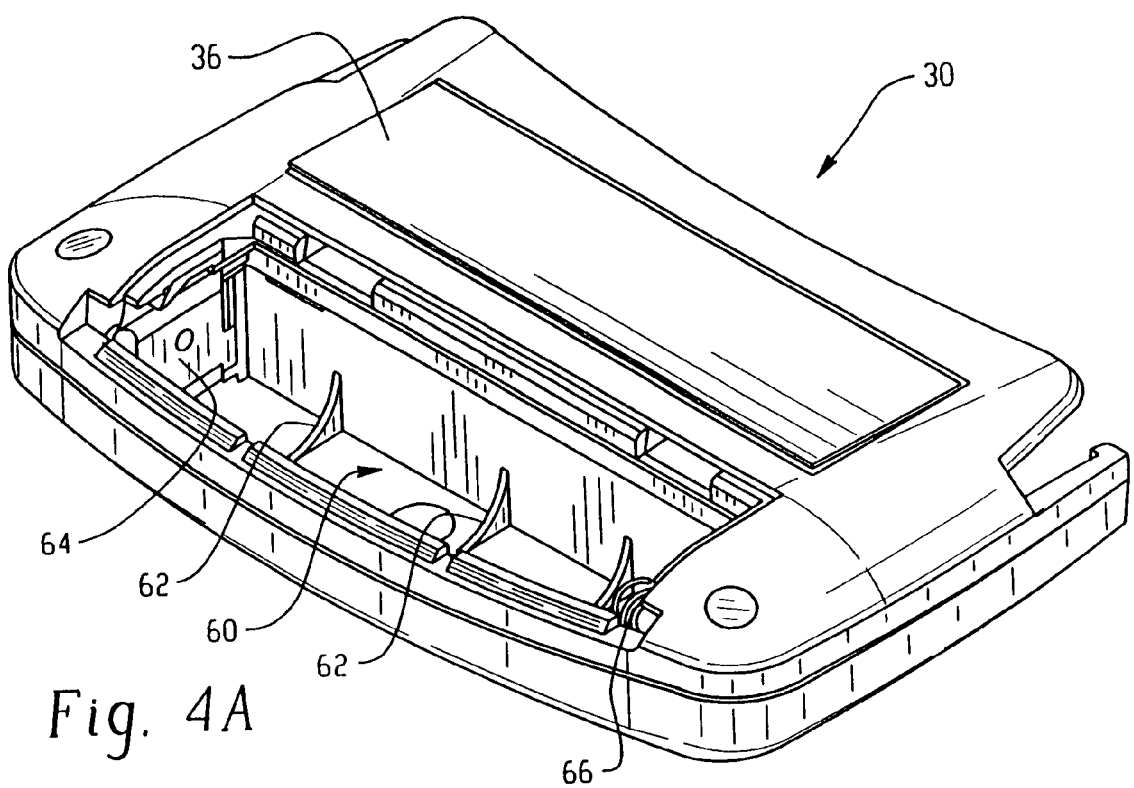
FIG. 4A is an orthogonal view of the back of the portable charger with a battery door cover removed.
Figure 4B:
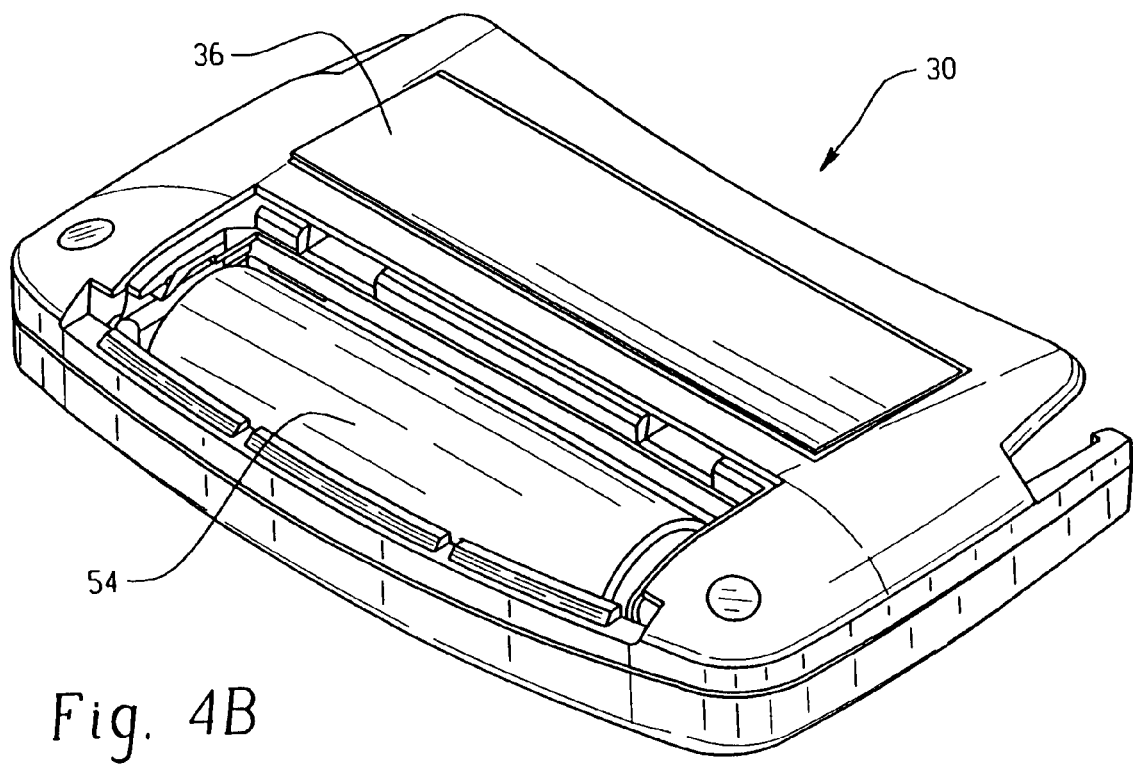
FIG. 4B is an orthogonal view similar to FIG. 4A with a battery installed.

FIG. 3 is an orthogonal view of the back of the portable battery charger 30. A battery cover 58 is slidably received on the back 36 of the portable charger 30. The battery cover 58 slides into place and is retained by an interference fit between the battery cover 58 and the back 36. FIG. 4A is an orthogonal view of the back of the portable charger 30 with the battery cover 58 removed. A battery compartment 60 includes battery guides 62, a positive contact 64, and a negative contact spring 66. The positive contact 64 and the negative contact spring 66 may, for example, be the battery contacts 12 and 13 described above with reference to FIG. 1. These components 62, 64, and 66 guide a battery so that the battery may be properly seated in the battery compartment 60. FIG. 4B is an orthogonal view of the back of the portable charger 30 with the battery door cover 50 removed, and a battery 68 inserted in the battery compartment 60.

FIG. 5 is an orthogonal view of the portable charger 30 connected to a portable electronic device 70. When attached to the mobile device 70, the portable charger 30 preferably extends from the base of the mobile device 70. A user can then carry both the portable charger 30 and the mobile device 70 so that the user may use the mobile device 70 as the portable charger 30 is charging the LiIon battery in the mobile device 70.

The embodiment described above is an example of structures or methods having elements corresponding to the elements recited in the claims. This written description may enable those skilled in the art to make and use embodiments having alternative elements that likewise correspond to the elements of the invention recited in the claims. The intended scope of the invention thus includes other structures or methods that do not differ from the literal language of the claims, and further includes other structures or methods with insubstantial differences from the literal language of the claims.

We claim:

1. A communication apparatus, comprising:
   a mobile communication device having a rechargeable battery; and
   a portable battery recharging unit detachably coupled to the mobile communication device for recharging the rechargeable battery, the portable battery recharging unit comprising:
   a housing;
   a battery fitted within the housing;
   a switching regulator coupled to the battery for generating a charging output; and
   a charging interface coupling the charging output from the switching regulator to the rechargeable battery within the mobile communication device in order to recharge the rechargeable battery;
   wherein the housing of the portable battery recharging unit includes a battery cover which covers a battery compartment that holds the battery, wherein the battery is removable from the portable battery recharging unit by detaching the battery cover from the housing; and
   wherein the switching regulator is configured to operate in two modes, a current limiting mode and a constant voltage mode.

2. The communication apparatus of claim 1, wherein the switching regulator operates in the current limiting mode until a threshold voltage is measured on the rechargeable battery and then switches to the constant voltage mode thereafter.

3. The communication apparatus of claim 2, wherein the threshold voltage is approximately 2.5 volts.

4. A communication apparatus, comprising:
   a mobile communication device having a rechargeable battery; and
   a portable battery recharging unit detachably coupled to the mobile communication device for recharging the rechargeable battery, the portable battery recharging unit comprising:
   a housing;
   a battery fitted within the housing;
   a switching regulator coupled to the battery for generating a charging output; and
   a charging interface coupling the charging output from the switching regulator to the rechargeable battery within the mobile communication device in order to recharge the rechargeable battery;
   wherein the housing of the portable battery recharging unit includes a battery cover which covers a battery compartment that holds the battery, wherein the battery is removable from the portable battery recharging unit by detaching the battery cover from the housing; and
   wherein the portable battery recharging unit further comprises: a controller, coupled to the charger interface and the switching regulator, for controlling the operation of the switching regulator based on one or more signals received from the mobile communication device.

5. The communication apparatus of claim 4, wherein the one or more signals includes a voltage level signal indicating the voltage of the rechargeable battery.

6. The communication apparatus of claim 4, wherein the one or more signals includes a temperature level signal indicating the temperature of the rechargeable battery.

7. A communication apparatus, comprising:
   a mobile communication device having a rechargeable battery; and
   a portable battery recharging unit detachably coupled to the mobile communication device for recharging the rechargeable battery, the portable battery recharging unit comprising:
   a housing;
   a battery fitted within the housing;
   a switching regulator coupled to the battery for generating a charging output; and
   a charging interface coupling the charging output from the switching regulator to the rechargeable battery within the mobile communication device in order to recharge the rechargeable battery;
   wherein the housing of the portable battery recharging unit includes a battery cover which covers a battery compartment that holds the battery, wherein the battery is removable from the portable battery recharging unit by detaching the battery cover from the housing; and
   wherein the portable battery recharging unit further comprises: a controller, coupled to the battery and the switching regulator, for turning on or off the switching regulator based on the voltage level of the battery.

8. The communication apparatus of claim 7, wherein the controller is further coupled to the charging interface, and provides a low voltage battery signal to the mobile communication device through the charging interface when the voltage of the battery drops below a predetermined low voltage threshold level.

9. The communication apparatus of claim 8, wherein the low voltage threshold level is approximately 1.0 volts.

10. A method of charging a rechargeable battery in a mobile communication device using a portable battery charger, comprising the steps of:
    physically and electrically coupling the portable battery charger to the mobile communication device;

receiving a low voltage source of energy from a battery within the portable battery charger;

converting the low voltage source of energy to a charging output using a switching regulator in the portable battery charger;

recharging the rechargeable battery by applying the charging output to the rechargeable battery through the electrical coupling of the portable battery charger and the mobile communication device; and operating the switching regulator in a current limiting mode until a threshold voltage is measured on the rechargeable battery and then operating the switching regulator in a constant voltage mode thereafter.

11. The method of claim 10, further comprising the step of:

providing a low voltage battery signal to the mobile communication device when the voltage level of the battery drops below a predetermined low voltage threshold level.

12. The method of claim 10, further comprising the steps of:

detecting if the battery is incorrectly installed in the portable battery charger, and if so, then decoupling the battery from the switching regulator.

13. The method of claim 10, wherein the step of operating the switching regulator is based upon the voltage level of the battery.

14. The method of claim 10, wherein the step of operating the switching regulator is based upon one or more signals received from the mobile communication device.

15. An apparatus for charging a rechargeable battery in a mobile communication device using a portable battery charger, comprising:

means for physically and electrically coupling the portable battery charger to the mobile communication device;

means for receiving a low voltage source of energy from a battery within the portable battery charger;

means for converting the low voltage source of energy to a charging output; and means for recharging the rechargeable battery by applying the charging output to the rechargeable battery through the electrical coupling of the portable battery charger and the mobile communication device; and means for operating a switching regulator based upon one or more signals received from the mobile communication device.

16. The apparatus of claim 15, wherein the means for converting includes the switching regulator, the apparatus further comprising:

means for operating the switching regulator in a current limiting mode until a threshold voltage is measured on the rechargeable battery and then operating the switching regulator in a constant voltage mode thereafter.

17. The apparatus of claim 15, wherein the one or more signals includes a voltage level signal indicating the voltage of the rechargeable battery.

18. The apparatus of claim 15, wherein the one or more signals includes a temperature level signal indicating the temperature of the rechargeable battery.

19. The apparatus of claim 15, wherein:

the means for operating the switching regulator is based upon the voltage level of the battery.

20. The method of claim 15, further comprising:

means for providing a low voltage battery signal to the mobile communication device when the voltage level of the battery drops below a predetermined low voltage threshold level.

21. The apparatus of claim 15, further comprising:

means for detecting if the battery is incorrectly installed in the portable battery charger, and if so, then decoupling the battery from the switching regulator.

22. An apparatus, comprising:

a mobile device having a rechargeable battery; and a battery charging device detachably connected to the mobile device, the battery charging device including:

battery contacts configured to receive a battery;

a switching regulator coupled to the battery contacts and configured to draw a voltage from the battery and convert the voltage to a charger output; and a charger interface configured to electrically engage the mobile device and further configured to couple the charger output from the switching regulator to the rechargeable battery in the mobile device, wherein the switching regulator is configured to operate in a first mode and a second mode, wherein the first mode is a current limiting mode.

23. The apparatus of claim 22, wherein the switching regulator generates a full duty cycle charger output when operating in the current limiting mode.

24. The apparatus of claim 22, wherein the second mode is a constant voltage mode.

25. The apparatus of claim 22, wherein the battery charging device further includes a control and monitor module coupled between the switching regulator and the charger interface and configured to control the charger output.

26. The apparatus of claim 25, wherein the control and monitor module is configured to switch the switching regulator from the first mode to the second mode when the voltage of the rechargeable battery is above a threshold voltage.

27. The apparatus of claim 26, wherein the threshold voltage is 2.5 V.

28. The apparatus of claim 25, wherein the control and monitor module monitors the voltage on the battery in order to turn the switching regulator off when the voltage of the battery is insufficient to charge the rechargeable battery.

29. The apparatus of claim 28, wherein the control and monitor module is configured to send a shutdown signal to the switching regulator when the voltage of the battery drops below a threshold voltage.

30. The apparatus of claim 29, wherein the threshold voltage is 1.0 V.

31. The apparatus of claim 28, wherein the control and monitor module is configured to send a low battery value to the mobile device when the voltage of the battery drops below a threshold voltage.

* * * * *